Aug. 6, 1968 G. R. CAMPBELL 3,395,533

PENDULUM CLOCK MECHANISM

Filed Dec. 20, 1966

INVENTOR.
GREGORY R. CAMPBELL
BY
ATTORNEY

United States Patent Office 3,395,533
Patented Aug. 6, 1968

3,395,533
PENDULUM CLOCK MECHANISM
Gregory R. Campbell, 1901 Heliotrope Drive,
Santa Ana, Calif. 92706
Filed Dec. 20, 1966, Ser. No. 603,313
8 Claims. (Cl. 58—129)

The present invention relates generally to pendulum clock mechanisms, and more particularly to such mechanisms which are easy to regulate and transport.

Pendulum mechanisms for clocks and other timing devices have not changed appreciably within the past years. Rather, relatively old designs are still employed in such mechanisms, and hence such mechanisms exhibit certain defects and faulty operation which were inherent in such designs.

Due to the old basic design, a relatively heavy pendulum bob must be employed to obtain the proper timing for the mechanism. Such heavy bob makes it difficult to transport or move the clock without first removing the bob. That is, the present day pendulum bob is so heavy that when the clock is moved, the weight ofthe bob causes damage to the balance wheel and other components. Also, present day pendulum clock mechanisms require extreme care in leveling the mechanism to insure that it operates accurately. Such leveling procedure is not only time consuming and tedious, but frequently is not done properly and hence results in faulty timing of the mechanism when in operation.

Other shortcomings of prior pendulum clock mechanisms result in a needlessly high cost of manufacture, due principally to the unusually high cost of many of the component parts.

In view of the foregoing, it is an object of the present invention to provide a pendulum clock mechanism which is capable of affording accurate timing while using a relatively light pendulum bob.

Another object of the present invention is to provide a pendulum clock mechanism having minimum spring sensitivity, and thus is more accurate in providing the desired timing function.

Another object of the present invention is to provide a pendulum clock mechanism as characterized above, which is easy to regulate and adjust, so that the timing of the mechanism can be properly fixed.

A further object of the present invention is to provide a pendulum clock mechanism as characterized above, which is capable of being accurately adjusted and placed in operation without the need for tedious and accurate leveling of the mechanism.

Another further object of the present invention is to provide a pendulum clock mechanism as characterized above, which employs spring damping means for controlling the movement of the pendulum rod.

A still further object of the present invention is to provide a pendulum clock mechanism as characterized above, which is simple and inexpensive to manufacture and which is rugged and dependable in operation.

The novel features which I consider characteristic of my invention are set forth with particularity in the appended claims. The device itself, however, both as to its organization and mode of operation, together with additional objects and advantages thereof, will best be understood from the following description of specific embodiments when read in connection with the accompanying drawings, in which:

Like reference characters indicate corresponding parts throughout the several views of the drawings.

Figure 1:
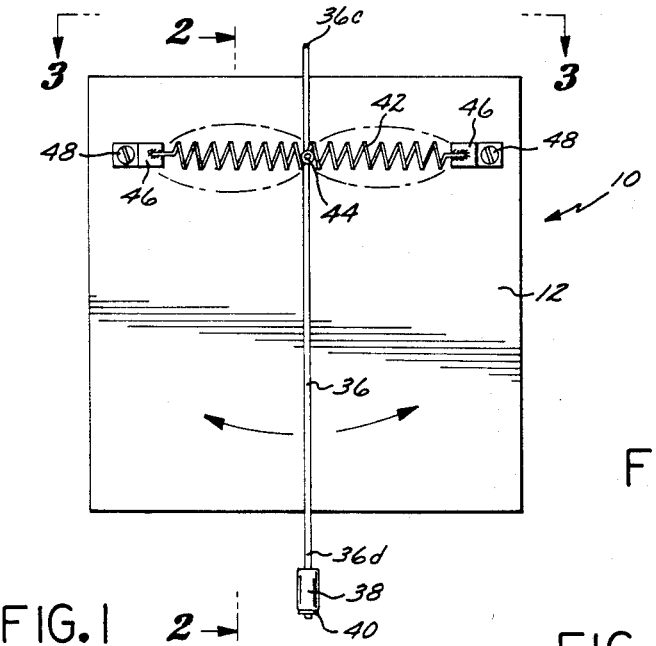
FIGURE 1 is a rear elevational view of a clock mechanism according to the present invention.

Referring to FIGURE 1 of the drawings, there is shown therein a pendulum clock mechanism 10 according to the present invention. Such mechanism comprises a back plate 12, a component which virtually every pendulum mechanism contains. Back plate 12 is firmly secured to the other portions of the clock (not shown), and may be formed of any appropriate material such as wood or the like.

An escapement assembly 20 is provided to effect the desired timing of the mechanism. It comprises an escapement shaft 22 which is rotatable about a horizontal axis, and is frequently referred to as a fork shaft. The latter description is appropriate in view of the fact that such shaft 20 carries fork members 24 on opposite sides thereof as shown most clearly in FIGURE 4 of the drawings. The fork members are provided with depending end portions 24a which engage the teeth or serrations 26a of an escapement wheel 26.

The opposite ends of shaft 20 are suitably formed to provide a bearing for rotatably mounting such shaft. End 20a of shaft 20 is rotatably positioned within front plate 28 which includes all movement shafts, whereas the other end 20b of shaft 20 is rotatably mounted within the plate 12. Thus, shaft 20 is free to rotate about an axis which is horizontal, provided the entire clock mechanism is in a horizontal position.

The escapement wheel 26 is secured to a shaft 30 which is rotatably positioned relative to back plate 12. One end of shaft 30 is positioned within an opening in plate 12 as shown most clearly in FIGURES 2 and 3 of the drawings.

Said shaft 30 may comprise drive means other than gear member 32.

Figure 2:
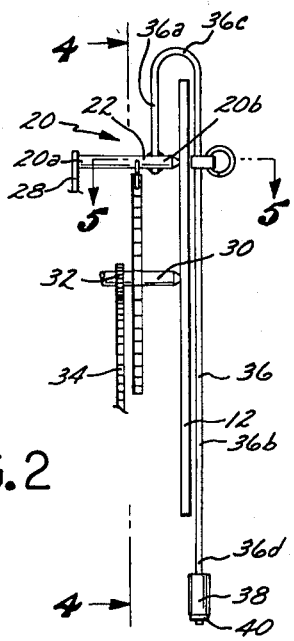
FIGURE 2 is a side elevational view of the clock mechanism, taken substantially along line 2—2 of FIGURE 1.
Figure 3:
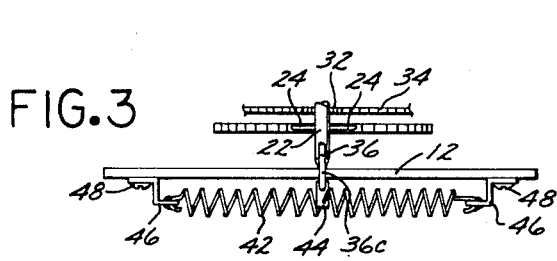
FIGURE 3 is a top plan view of the mechanism, taken substantially along line 3—3 of FIGURE 1.

Secured to shaft 20, as by welding, brazing, soldering or the like, is a generally U-shaped pendulum rod 36. This rod is formed in a single piece, and is provided with a short leg 36a and a long leg 36b. The intermediate portion 36c is reversely bent as shown in FIGURE 2 to enable the long leg 36b to extend downwardly and parallel to the back plate 12 of the clock mechanism 10. The short leg 36a of rod 36 may be press-fitted into a transverse opening in shaft 20.

Attached to the lower end 36d of pendulum rod 36 is a pendulum bob 38 and appropriate adjustment means 40. The adjustment means may be employed to raise and lower the bob on the rod so as to alter the timing afforded by the entire mechanism.

Normally, pendulum rods are formed in two pieces because of the technical relationship between the movement of the pendulum rod and the timing to be afforded by the entire clock mechanism. That is, due to the scientific principles relating to the action of pendulums, prior clock mechanisms found it necessary to have a heavy pendulum bob in order to afford the proper timing. To prevent undue wear due to such heavy weight, prior pendulum clock mechanisms used rods formed in two parts. The second or lower part of such rod had its upper end secured to the back plate while its lower end carried the pendulum bob. The first or upper part of a prior pendulum rod was then loosely associated with the second part, midway throughout the latter's entire length. In this way, the upper pendulum part which was connected to the pivotal shafts did not carry the heavy weight. The action of the bob and lower pendulum part was transmitted to the upper part to effect control of the escapement wheel in response to the pendulum action.

The instant invention, as will be readily apparent to those persons skilled in the art, eliminates the need for such two part pendulum rod, and rather merely requires the single rod as shown in the drawings.

To assist in permitting only a single pendulum rod to be used in the subject mechanism, there is provided on rod 36 biasing means in the form of a coil spring 42. Such spring is of relatively standard tubular hairspring design and construction and is under slight tension when applied to the subject mechanism as will hereinafter become more apparent.

There are several details of construction and assembly in applying spring 42 to the subject mechanism. Firstly, to be most effective the spring 42 must be positioned such that its axis intersects the axis of escapement shaft 20. That is, the spring 42 must be so attached to back plate 12 that the axis thereof is at right angles to and intersects the axis of rotation of shaft 20. Also, the axis of spring 42 and the axis of shaft 20 must lie within a plane which is substantially at right angles to the long leg 36b of pendulum rod 36. Thus, after the mechanism is properly positioned, the pendulum rod 36 will be substantially vertical in its free-standing position, and the plane having the axes of spring 42 and shaft 20 will be horizontal.

Figure 5:
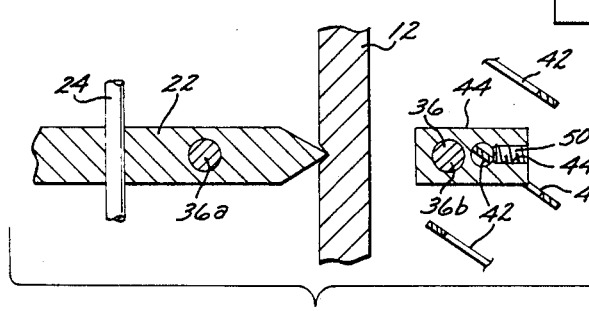
FIGURE 5 is an enlarged sectional view, taken substantially along line 5—5 of FIGURE 2.

To properly secure the midpoint of spring 42 to leg 36b of pendulum rod 36, there is provided appropriate means such as a mounting member 44 as shown in FIGURE 5. Such member is carried by pendulum rod 36 and is formed with an opening for receiving one of the convolutions of coil spring 42. Said member 44 is further formed with a threaded opening 44a for receiving a set screw 50 whereby the mounting member can be firmly secured to the spring 42 as shown in FIGURE 5.

The opposite ends of spring 42 are secured to back plate 12 by suitable brackets 46 and mounting bolts or screws 48. The opposite ends of spring 42, of course, are inserted within suitable openings in the brackets 46 as shown most clearly in FIGURE 3 of the drawings. For proper spring action, it is preferable to have the opposite ends of spring 42 be non-pivotable relative to such brackets. Thus such spring ends may be welded or firmly pinned to the respective brackets.

In the assembly operation, the mounting member 44 is secured to the spring 42, and thereafter the brackets are pulled outwardly to provide a slight tension to spring 42. While in such conditions, the mounting bolts 48 are secured to back plate 12 as shown in the drawings.

Figure 4:
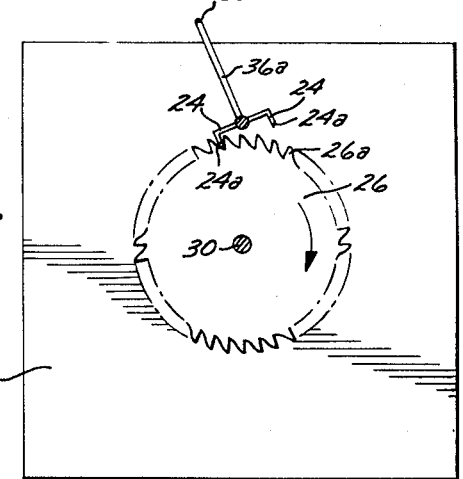
FIGURE 4 is a front elevational view of the subject pendulum clock mechanism, taken substantially along line 4—4 of FIGURE 2.

As will be readily apparent to those persons skilled in the art, the subject mechanism operates by virtue of the rocking pivotal movement of escapement shaft 20, the ends 24a of fork members 24 alternately engaging the serrated periphery of escapement wheel 26 as shown most clearly in FIGURE 4 of the drawings. The teeth 26a of wheel 26 are so spaced with respect to the distance between the ends 24a of the several fork members 24 that each rocking pivotal movement of shaft 20 causes the escapement wheel 26 to be advanced a predetermined fixed distance. Thus the movement of wheel 26 is accurately timed by the action of the pendulum.

The escapement shaft 20 is rocked back and forth by virtue of the swinging movement of pendulum rod 36. The weight 38 on the end thereof assists in moving the entire rod back and forth about the pivotal axis of shaft 20.

With the spring 42 secured at its midpoint to rod 36, it is seen that such spring is caused to flex throughout the swinging movement of the pendulum rod. However, since the axis of spring 42 intersects the axis of rotation of shaft 20, the spring 42 moves back and forth between the extreme positions shown in the broken lines in FIGURE 1 of the drawings. That is, rather than such spring being compressed or expanded, it is twisted so that both tension and compression is provided therein. In any event, the free position of spring 42 is such that the rod 36 is effectively biased by such spring to its free-standing position as shown in FIGURE 1 of the drawings.

It has been found that by virtue of the aforedescribed arrangement, the pendulum bob 38 may be relatively light in weight since the damping spring 42 assists in the pendulum action. As such, the weight of bob 38 need not be such as to cause injury to the clock mechanism when the entire clock is moved. That is, the weight is not such as to cause the escapement fork to dig into the escapement wheel and injure the teeth or serrations 26a thereof.

Also, since the pendulum action is somewhat augmented by the action of spring 42, the positioning of the entire clock mechanism need not be as accurate. Since the action of spring 42 is not dependent upon the force of gravity as is the action of the pendulum rod itself, the position of the clock mechanism is not as critical as with prior pendulum clock mechanisms.

It is contemplated within the scope of the present invention that the coils or convolutions of spring 42 can be reversed on opposite sides of pendulum rod 36 with the mounting member attached to the portion of spring 42 intermediate such reversed helical spring sections.

It has been discovered that the present invention provides a timing mechanism which is relatively insensitive to the spring force used to drive the mechanism. That is, whereas prior devices tend to vary in speed as the drive spring runs down, the present mechanism is affected to a lesser extent by such variations in spring force.

It is thus seen that the present invention provides a pendulum clock mechanism which is capable of affording more accurate timing than prior devices, and enables the entire mechanism to be easily transported.

I claim:

1. Spring compensated means for use in a pendulum clock mechanism comprising in combination, an escapement fork assembly comprising a shaft for pivotal movement about a given axis and an escapement member fixed to said shaft and having oppositely disposed end portions, an escapement wheel having a serrated marginal edge and being disposed for engagement alternately by the opposite end portions of said escapement member to effect corresponding timed movement of said wheel, a pendulum rod fixed to said shaft to form a unitary structure therewith to control rotation of said shaft about said given axis and having a pendulum bob at its lower end, and spring means comprising an elongated spring member having opposite ends anchored relative to said unitary structure and an intermediate portion fixed thereto, whereby reverse pivotal movement of said pendulum rod is damped by said spring as it effects corresponding pivotal movement of said escapement shaft.

2. Spring compensated means for use in a pendulum clock mechanism according to claim 1, wherein said elongated spring member has an operating axis which substantially intersects the given axis of rotation of said escapement shaft.

3. Spring compensated means for use in a pendulum clock mechanism according to claim 2, wherein said spring member is a light-weight coil spring the opposite ends of which are anchored and an intermediate portion of which is attached to said pendulum rod.

4. Spring compensated means for use in a pendulum clock mechanism according to claim 2, wherein said clock mechanism comprises a back plate and said pendulum rod extends upwardly from said shaft and then downwardly along said back plate, said elongated spring member having its opposite end fixed to said plate and its mid-point fixed to said rod.

5. Spring compensated means for use in a pendulum clock mechanism according to claim 4, wherein said escapement shaft is disposed substantially horizontally and said back plate and pendulum rod are disposed substantially vertically, said elongated spring having its operating axis normal to both the given axis of said escapement shaft and said pendulum rod to effect only damping of the motion of said pendulum as it pivots within a plane normal to the given axis of said shaft.

6. Spring compensated means for use in a pendulum clock mechanism according to claim 5, wherein said elongated spring is a coil spring the opposite ends of which are anchored to said back plate to provide predetermined tension in said spring.

7. Spring compensated means for use in a pendulum clock mechanism according to claim 6, wherein said pendulum rod is of unitary construction and is attached solely to said escapement shaft and to said elongated spring.

8. Spring compensated means for use in a pendulum clock mechanism according to claim 7, wherein said pendulum rod is a generally U-shaped one-piece member extending over said back plate and having no connection therewith other than through said elongated spring.

References Cited
UNITED STATES PATENTS

| | | | |
|---|---|---|---|
| 212,045 | 2/1879 | Owen | 58—134 |
| 221,490 | 11/1879 | Abernethy | 58—123 |
| 626,807 | 6/1899 | Gundorph | 58—124 |
| 1,522,099 | 1/1925 | Brigden | 58—123 |
| 1,595,170 | 8/1926 | Schieferstein | 58—129 |
| 1,945,069 | 1/1934 | Poole | 58—30 |
| 2,713,399 | 7/1955 | Magidson | 58—123 X |
| 2,760,331 | 8/1956 | Reiner | 58—124 X |

ROBERT S. WARD, Jr., *Primary Examiner.*

S. A. WAL, *Assistant Examiner.*